J. H. WOOD.
Dumping-Wagon.

No. 73,684.

Patented Jan. 21, 1868.

United States Patent Office.

JOHN HENRY WOOD, OF TRENTON, NEW JERSEY.

Letters Patent No. 73,684, dated January 21, 1868.

IMPROVEMENT IN WAGONS FOR UNLOADING COAL.

*The Schedule referred to in these Letters Patent and making part of the same.*

TO ALL WHOM IT MAY CONCERN:

Be it known that I, JOHN HENRY WOOD, of Trenton, county of Mercer, and State of New Jersey, have invented a new and useful "Attachment to Carts or Wagons for Unloading Coal," &c.; and I do hereby declare the following to be an exact description thereof, reference being had to the accompanying drawings, and to the letters of reference marked thereon, making a part of this specification, in which—

Figure 1:
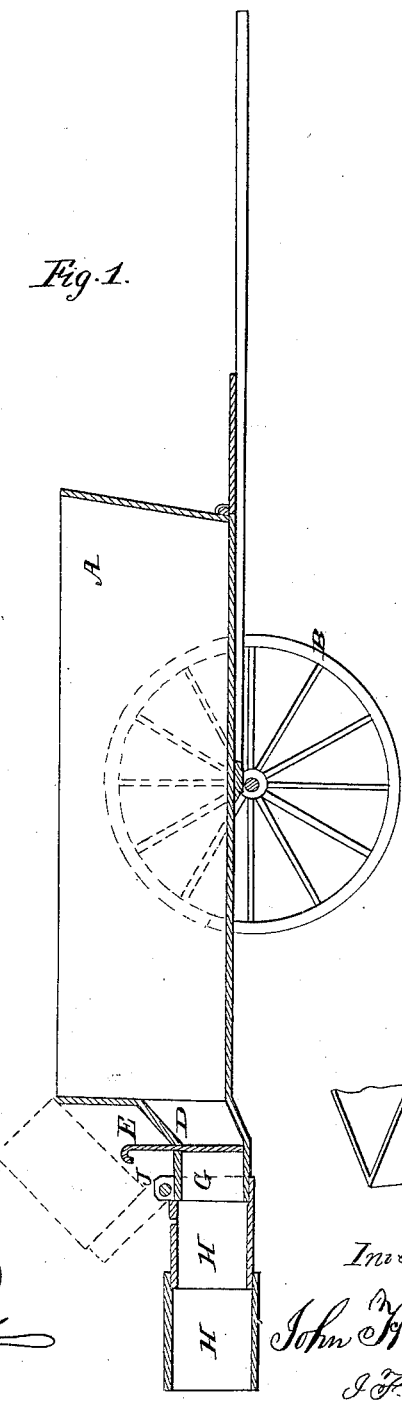

Figure 1 represents a side elevation of the cart with its attachment.

Figure 2:
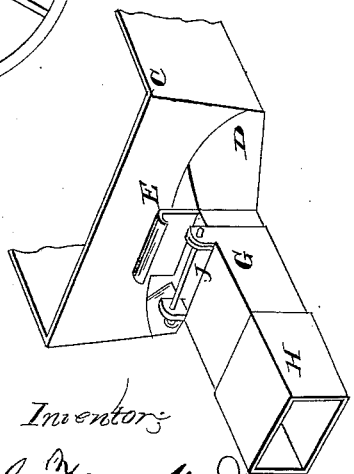

Figure 2, a perspective view of the attachment.

The nature of my invention consists in the funnel-shaped mouth attached to the cart, in combination with the chute and valve.

A represents the cart, B the carriage-wheels, C the rear end or side of the cart, in which an open, wide, or funnel-shaped mouth, D, is constructed, with an incline chute, to which a grate or valve, E, is attached, and from which an extension-tube or chute, G, projects, with one or more extension-tubes or chutes, H, fitting in each other, or connected by a hinge or hinges, J. These extension-tubes may be square, cylindrical, or trough-shaped, and attached, by hinges or otherwise, to the rear end or side of a cart or wagon, and they are for the purpose of unloading coal or any material, whenever required to be unloaded, or more especially to pass down coal into a cellar-window or vault under a pavement, and save the dust and dirt from being scattered over the pavement, and likewise the labor of shovelling the coal into a vault or cellar-window, which is now usually the trouble.

What I claim as my invention, and desire to secure by Letters Patent, is—

1. The attachment of a funnel-shaped or incline mouth, D, of any material, to the rear or side of a cart or wagon, as herein described, and for the purpose set forth.

2. I also claim the valve or gate E at the end of the mouth D, or in the chute or tube G, when combined, as herein described, and for the purpose set forth.

3. I also claim the hinged or sliding chutes or tubes H, when attached to an open mouth, or to the end or side of a cart or wagon, for the purpose herein set forth.

JOHN HENRY WOOD.

Witnesses:
   J. FRANKLIN REIGART,
   EDM. F. BROWN.